June 23, 1959     C. J. BIRDSALL     2,891,805
TRAILER LANDING GEAR
Filed June 20, 1957     2 Sheets-Sheet 1
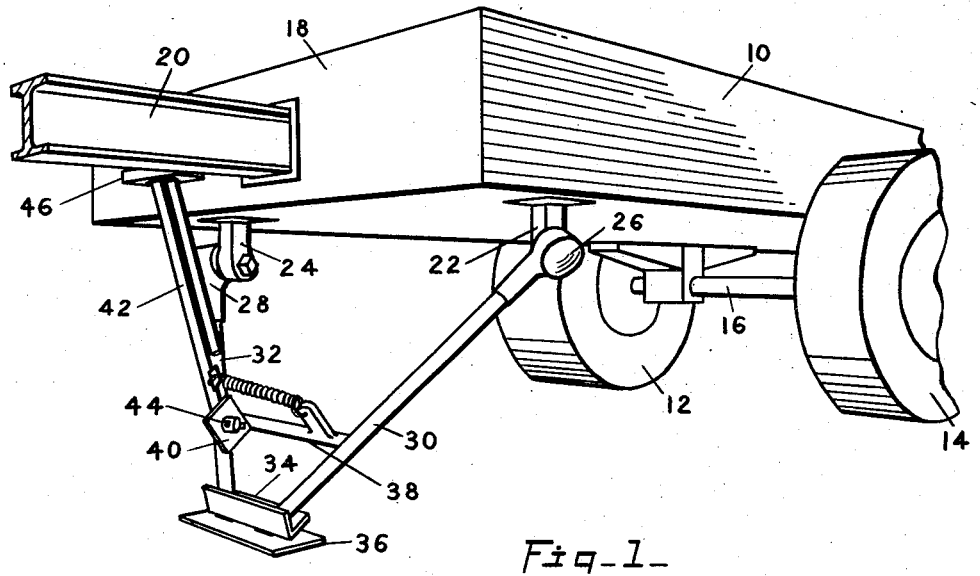
Fig-1-
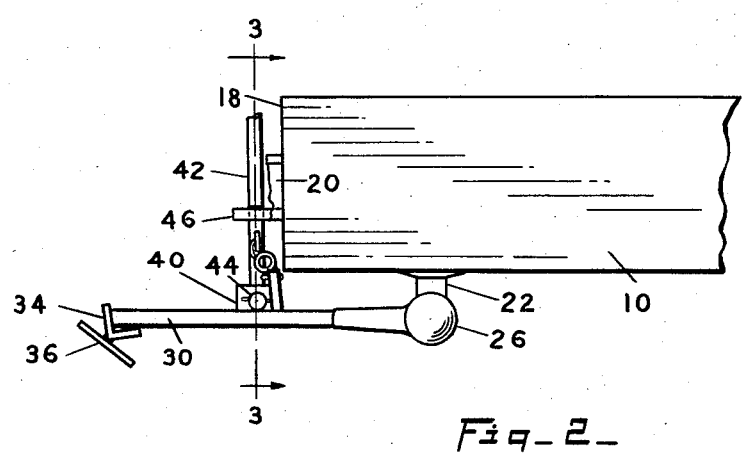
Fig-2-
INVENTOR.
CHARLES J. BIRDSALL
BY 

June 23, 1959 C. J. BIRDSALL 2,891,805
TRAILER LANDING GEAR
Filed June 20, 1957 2 Sheets-Sheet 2
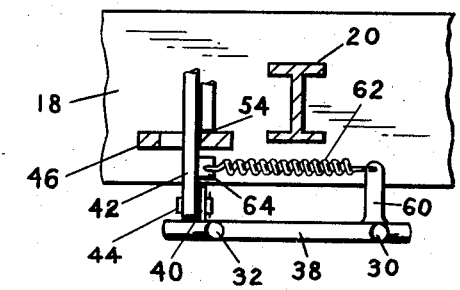
Fig_3_
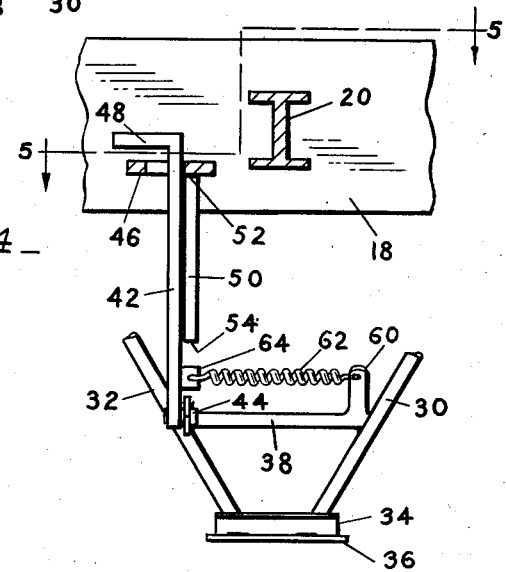
Fig_4_
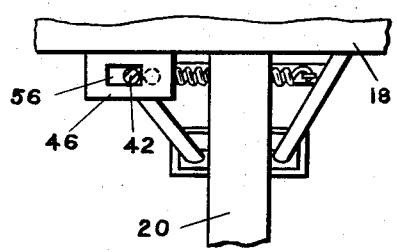
Fig_5_

United States Patent Office 2,891,805
Patented June 23, 1959

2,891,805

TRAILER LANDING GEAR

Charles J. Birdsall, Hornell, N.Y.

Application June 20, 1957, Serial No. 666,870

2 Claims. (Cl. 280—150.5)

This invention relates to trailer landing gear, and more particularly to a retractable ground support for use in parking two wheel trailers.

In two wheel trailers of the type referred to, the balance is such that a preponderance of the weight is forward of the two wheel axle, so that in drawing the trailer by means of the draw bar, a certain amount of weight bears upon the tractor vehicle. It is desirable to provide a ground support for the forward end of such trailers for use when it is desired to uncouple the tractor vehicle. Such ground support is adapted to provide in combination with the wheels, a three point support which preferably supports the trailer substantially level or in about the same manner as when coupled to the tractor vehicle.

It is desirable that the ground support be readily positioned to support the trailer and also readily retracted to a position clear of the ground, and that provision be made for rigidly securing the support in either position, without the exercise of undue effort. The invention is directed to a ground support comprising a V frame universally pivoted to the underside of the trailer frame, the support extending forwardly under the draw bar, and having manually actuatable locking means for quickly securing the V frame in the support position or the retracted clear position.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

Figure 1 is a perspective view of the front end of a trailer with the landing gear in operative position;

Figure 2 is a fragmentary side view of the trailer with the gear in the retracted clear position;

Figure 3 is a fragmentary sectional view taken on the line 3—3 of Figure 2;

Figure 4 is a view similar to Figure 3, but with the gear in lowered operative position; and Figure 5 is a top plan view of the gear taken substantially on the broken section line 5—5 of Figure 4.

Referring to the drawings there is shown a trailer frame 10 having a pair of road wheels 12 and 14 mounted on an axle 16 extending beneath the frame transversely thereof and rearward of the center of gravity, preferably.

From the front transverse frame member 18, extends a draw bar 20 which is adapted to be coupled to a tractor vehicle, in a manner well understood in the art.

Underneath the frame 10 are mounted a pair of spaced perches or pivot brackets 22 and 24, upon which are pivotally mounted the ends 26 and 28, of a pair of forwardly extending converging arms 30 and 32. The pivotal connection may be of the universal ball and socket type, if desired, or a plain pivot connection can be used. The struts or arms extend forwardly, and are rigidly attached as by welding, to a transverse angle member 34, which in turn is provided with a ground plate 36, welded or otherwise secured to the outside corner of the angle member 34.

The arms are provided with a transverse brace 38, and the strut 32 is provided with a pivot plate 40, located just forward of the brace 38. An upwardly extending manually operable brace or strut 42, pivotally attached to the plate 40, as by a bolt 44, extends through a slotted guide plate 46 rigidly secured to the forward face of the frame member 18. The brace 42 is provided with a convenient handle 48 at its upper end, and is provided with a member 50, extending along a substantial portion of its length to provide upper and lower shoulders 52 and 54 adapted to engage the guide plate 46, either from the under side, or the upper side depending upon whether the landing gear is in operative position as shown in Figure 1 or retracted position as indicated in Figure 2. The guide plate is shown as rigidly secured to the transverse frame member 18, but could be, if desired, secured to the tongue 20. In trailers wherein the tongue is detachable, so that the strut 32 may be located nearer the center, the plate 40 may be mounted on the brace 38 near the center thereof, and plate 46 located nearer the center.

The brace has slight lateral pivotal movement on the bolt 44, so that the brace can be moved laterally in the slot 56 in the guide plate 46. The slot is of sufficient transverse width to freely permit the brace and the shoulder member 50 to slide through, for moving the landing gear from operative to retracted position and vice versa.

In order to bias the brace so as to assure engagement of the shoulders 52 and 54 with the underside of the guide plate or the upper side thereof, as the case may be, the transverse brace 38 is provided with an upstanding arm 60, and a tension coil spring 62 extends from the arm to an ear 64 mounted on the brace 42.

It will be seen from the foregoing description that a landing gear is provided that can be instantly raised or lowered, and when in either position the gear is securely locked. When the gear is in the upper position, and subject to road shock and vibration, it is important that the gear be held in retracted clear position. It will be observed that when in retracted position, the movement of the brace 42 to release the shoulder 54, so that it can pass downward through the slot 56, is considerably greater than when the gear is in lowered operative position. It will also appear that spring 62 acts directly and is more effective to hold the brace in locked position in the retracted position. Further, it will appear that by reason of the relatively long arm between the shoulder 54 and handle 48, the arm is readily swung against the tension of the spring to release the shoulder 54, when it is desired to permit the brace and member 50 to pass downwardly through the slot. Although the gear is adaptable to trailers as shown, it will be appreciated that the same might be adapted for use where a retractable supporting leg is desirable as, for example, at the rear end of a truck or in connection with a shovel or crane.

While a single embodiment of the invention has been illustrated and described, it is to be understood that the invention is not limited thereto. As various changes in the construction and arrangement may be made without departing from the spirit of the invention, as will be apparent to those skilled in the art, reference will be had to be appended claims for a definition of the limits of the invention.

What is claimed is:

1. A trailer landing gear comprising a pair of perches adapted to be attached in spaced lateral relation to a trailer frame, a rigid V frame comprising a pair of diverging bars, said bars being secured at their adjacent ends to a ground engaging plate, said bars at their respective divergent ends being universally pivoted to said respective perches, a brace bar pivotally attached to said V frame adjacent the ground engaging plate end thereof, said brace bar being adapted to extend upwardly from one side of said V frame, an arm extending upwardly from the other side of said V frame, said brace bar having upwardly and downwardly facing spaced shoulder means thereon, on the side thereof adjacent said arm, a tension spring connecting said arm and brace bar, and a guide plate adapted for mounting on the trailer frame, said guide plate having a slot through which said brace bar and shoulder means slidingly extends, and said plate being adapted to engage one or the other of said shoulder means from above or below to suport said V frame, in a retracted position or a ground engaging position and said spring being adapted to yieldingly retain one or the other of said shoulder means in abutting relation with the under side or upper side of said plate.

2. A trailer landing gear comprising a trailer frame, a pair of perches mounted in spaced lateral relation to the underside of said trailer frame, a rigid V frame comprising a pair of diverging bars, said bars being secured at their adjacent ends to a ground engaging plate, said bars at their respective divergent ends being universally pivoted to said respective perches, said V frame extending forwardly of said trailer frame and being adapted to be moved from a retracted position wherein the V frame lies substantially horizontal, and a ground engaging position wherein the V frame extends forwardly and downwardly at an angle from said perches, a brace bar pivotally attached to said V frame adjacent the ground engaging plate end thereof, said brace bar being adapted to extend upward from said V frame, an arm extending upwardly from the other side of said V frame, said brace bar having upwardly and downwardly facing spaced shoulder means thereon, on the side thereof adjacent said arm, a tension spring connecting said arm and brace bar, and a guide plate mounted on the trailer frame above the ground engaging end of the V frame, said guide plate having a slot through which said brace bar and shoulder means slidingly extends, and being adpted to engage one or the other of said shoulder means from above or below to support said V frame, to the retracted position or the ground engaging position of said V frame and said spring being adapted to yieldingly retain one or the other of said shoulder means in abutting relation with the under side or upper side of said plate.

References Cited in the file of this patent

UNITED STATES PATENTS

| | | |
|---|---|---|
| 775,998 | Streich | Nov. 29, 1904 |
| 1,102,346 | Lohr | July 7, 1914 |
| 2,309,618 | Hyland et al. | Jan. 26, 1943 |
| 2,499,882 | Seaholm | Mar. 7, 1950 |

FOREIGN PATENTS

| | | |
|---|---|---|
| 22,945 of 1899 | Great Britain | Nov. 17, 1900 |